(12) United States Patent
Hwang (10) Patent No.: US 12,294,164 B2
(45) Date of Patent: May 6, 2025

(54) RFID ANTENNA MODULE

(71) Applicant: AMOTECH CO., LTD., Incheon (KR)

(72) Inventor: Chul Hwang, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 176 days.

(21) Appl. No.: 18/019,073

(22) PCT Filed: Jun. 23, 2021

(86) PCT No.: PCT/KR2021/007872
§ 371 (c)(1),
(2) Date: Jan. 31, 2023

(87) PCT Pub. No.: WO2022/025438
PCT Pub. Date: Feb. 3, 2022

(65) Prior Publication Data
US 2023/0307838 A1  Sep. 28, 2023

(30) Foreign Application Priority Data

Jul. 31, 2020  (KR) .................. 10-2020-0095899

(51) Int. Cl.
*H01Q 9/04* (2006.01)
*G06K 7/10* (2006.01)
*H01Q 1/22* (2006.01)

(52) U.S. Cl.
CPC ....... *H01Q 9/0407* (2013.01); *G06K 7/10316* (2013.01); *H01Q 1/2225* (2013.01)

(58) Field of Classification Search
None
See application file for complete search history.

(56) References Cited

U.S. PATENT DOCUMENTS

| | | | |
|---|---|---|---|
| 2008/0100530 A1* | 5/2008 | Manholm | ............ H01Q 9/0428 343/893 |
| 2010/0007560 A1 | 1/2010 | Ryou et al. | |
| 2016/0211581 A1 | 7/2016 | Sampo et al. | |
| 2020/0136257 A1 | 4/2020 | Hwang | |

FOREIGN PATENT DOCUMENTS

| | | | |
|---|---|---|---|
| JP | 2966690 B2 | 10/1999 | |
| JP | 2015-019132 A | 1/2015 | |
| KR | 10-2008-0032303 A | 4/2008 | |
| KR | 10-2010-0006948 A | 1/2010 | |
| KR | 10-0976087 B1 | 8/2010 | |
| KR | 10-1857459 B1 | 5/2018 | |
| KR | 10-1862753 A | 5/2018 | |
| KR | 10-2018-0104906 A | 9/2018 | |
| KR | 10-2018049 B1 | 9/2019 | |
| WO | WO-2021040366 A1 * | 3/2021 | ............... H01Q 1/12 |

OTHER PUBLICATIONS

KR Office Action dated Nov. 18, 2022 as received in Application No. 10-2021-0081453.

* cited by examiner

*Primary Examiner* — Jany Richardson
(74) *Attorney, Agent, or Firm* — Maschoff Brennan

(57) ABSTRACT

Proposed is an RFID antenna module in which feed pins of a patch antenna are connected to a first coupler and a second coupler so that the patch antenna operates as a left hand circular polarization antenna and a right hand circular polarization antenna. The proposed RFID antenna module comprises first to fourth feed pins penetrating through a laminate in which a dielectric, an upper patch, and a lower patch are laminated, and the first to fourth feed pins are spaced apart from each other.

8 Claims, 7 Drawing Sheets

RFID ANTENNA MODULE

TECHNICAL FIELD

The present disclosure relates to an antenna module mounted on an RFID reader

BACKGROUND ART

In general, an RFID reader receives a signal transmitted from an RFID tag to recognize a device equipped with an RFID tag. The RFID reader is configured to include two antennas with different polarization to increase a tag recognition speed. For example, the RFID reader includes a left hand circular polarization (LHCP) antenna and a right hand circular polarization (RHCP) antenna.

However, since the conventional RFID reader needs to mount two antennas, there is a problem in that the antenna mounting space increases, the size increases, and the manufacturing cost increases.

DISCLOSURE

Technical Problem

An object of the present disclosure is to provide an RFID antenna module in which feed pins of a patch antenna are connected to a first coupler and a second coupler so that the patch antenna operates as a left hand circular polarization antenna and a right hand circular polarization antenna.

Technical Solution

According to a characteristic of the present disclosure for achieving the object, the present disclosure includes an RFID antenna module including: a dielectric; an upper patch disposed on an upper surface of the dielectric; a lower patch disposed on a lower surface of the dielectric; a first feed pin penetrating through the dielectric, the upper patch, and the lower patch; a second feed pin penetrating through the dielectric, the upper patch, and the lower patch and spaced apart from the first feed pin; a third feed pin penetrating through the dielectric, the upper patch, and the lower patch and spaced apart from the first feed pin and the second feed pin; and a fourth feed pin penetrating through the dielectric, the upper patch, and the lower patch and spaced apart from the first feed pin, the second feed pin, and the third feed pin.

Included angles between a first imaginary line connecting the first feed pin and the third feed pin and a second imaginary line connecting the second feed pin and the fourth feed pin may all be formed at the same angle.

The first imaginary line connecting the first feed pin and the third feed pin and the second imaginary line connecting the second feed pin and the fourth feed pin may be orthogonal.

An included angle between a first imaginary straight line connecting the first feed pin and a center point of the upper patch and a second imaginary straight line connecting the second feed pin and the center point of the upper patch may have a set angle of 85° or more and 95° or less, and an included angle between a third imaginary straight line connecting the third feed pin and a center point of the upper patch and a fourth imaginary straight line connecting the fourth feed pin and the center point of the upper patch may have a set angle of 85° or more and 95° or less.

The first feed pin, the second feed pin, the third feed pin, and the fourth feed pin may be spaced apart from a center point of the dielectric, the upper patch and the lower patch by the same distance.

The RF antenna module may further include: a first coupler connected to the first feed pin and the second feed pin and converting a signal input through the first feed pin and the second feed pin into a right hand circular polarization signal and outputting the right hand circular polarization signal; and a second coupler connected to the third feed pin and the fourth feed pin and converting a signal input through the third feed pin and the fourth feed pin into a left hand circular polarization signal and outputting the left hand circular polarization signal.

The first coupler may include: a first input terminal connected to the first feed pin; a second input terminal connected to the second feed pin; a first output terminal outputting the right circular polarization signal; and a second output terminal to which a first resistor having a set resistance value is connected.

The second coupler may include: a third input terminal connected to the third feed pin; a fourth input terminal connected to the fourth feed pin; a third output terminal outputting the left hand circular polarization signal; and a fourth output terminal to which a second resistor having a set resistance value is connected.

Advantageous Effects

According to the present disclosure, according to an RFID antenna module of the present disclosure, it is possible to configure a left hand circular polarization antenna and a right hand circular polarization antenna with one patch antenna by connecting the feed pins of the patch antenna to the first coupler and the second coupler.

In addition, according to an RFID antenna module of the present disclosure, it is possible to reduce a mounting space by half compared to the conventional patch antenna including a left hand circular polarization antenna and a right hand circular polarization antenna independent of each other by configuring the left hand circular polarization antenna and the right hand circular polarization antenna with one patch antenna.

In addition, according to an RFID antenna module of the present disclosure, it is possible to reduce manufacturing costs by half compared to the conventional patch antenna including a left hand circular polarization antenna and a right hand circular polarization antenna independent of each other by configuring the left hand circular polarization antenna and the right hand circular polarization antenna with one patch antenna.

MODE FOR INVENTION

Hereinafter, in order to describe in detail to the extent that those skilled in the art can easily practice the technical idea of the present disclosure, the most preferred embodiments of the present disclosure will be described with reference to the accompanying drawings. First, it is to be noted that in giving reference numerals to components of each of the accompanying drawings, the same components will be denoted by the same reference numerals even though they are illustrated in different drawings. Further, in describing exemplary embodiments of the present disclosure, well-known functions or constructions will not be described in detail since they may unnecessarily obscure the understanding of the present disclosure.

Figure 1:
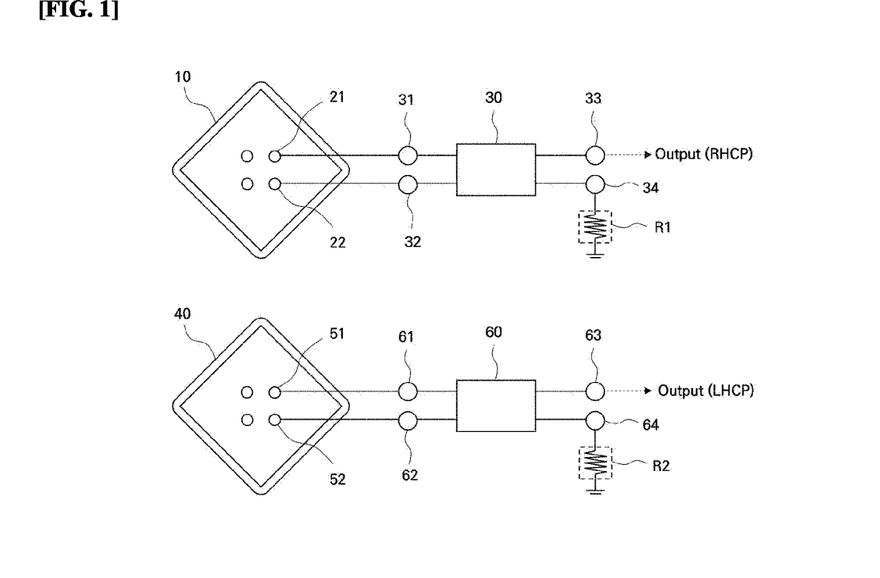
FIG. 1 is a diagram for describing a conventional RFID antenna module mounted in an RFID reader.

Referring to FIG. 1, a conventional RFID antenna module includes a first patch antenna 10 and a second patch antenna 40.

A pair of feed pins 21 and 22 is inserted into the first patch antenna 10, the feed pin 21 is connected to a first input terminal 31 of the coupler 30, and the feed pin 22 is connected to a second input terminal 32 of a coupler 30. The coupler 30 converts an RFID signal input through the first input terminal 31 and the second input terminal 32 into a right hand circular polarization (RHCP) signal and outputs the right hand circular polarization signal to the first output terminal 33. In this case, a resistor R1 is connected to the second output terminal 34 of the coupler 30.

A pair of feed pins 51 and 52 is inserted into the second patch antenna 40, the feed pin 51 is connected to a first input terminal 61 of a coupler 60, and the feed pin 52 is connected to a second input terminal 62 of the coupler 60. The coupler 60 converts an RFID signal input through the first input terminal 61 and the second input terminal 62 into a left hand circular polarization (LHCP) signal and outputs the left hand circular polarization signal to the first output terminal 63. In this case, a resistor R2 is connected to the second output terminal 64 of the coupler 60.

As such, since the conventional RFID antenna module needs to mount two patch antennas 10 and 40, there is a problem in that the antenna mounting space inevitably increases, and the size of the RFID reader increases due to the increase in the antenna mounting space.

In addition, since the conventional RFID antenna module includes two patch antennas 10 and 40, there is a problem in that manufacturing cost increases.

Accordingly, the RFID antenna module according to the embodiment of the present disclosure is configured to output the RHCP signal and the LHCP signal using one patch antenna.

Figure 2:
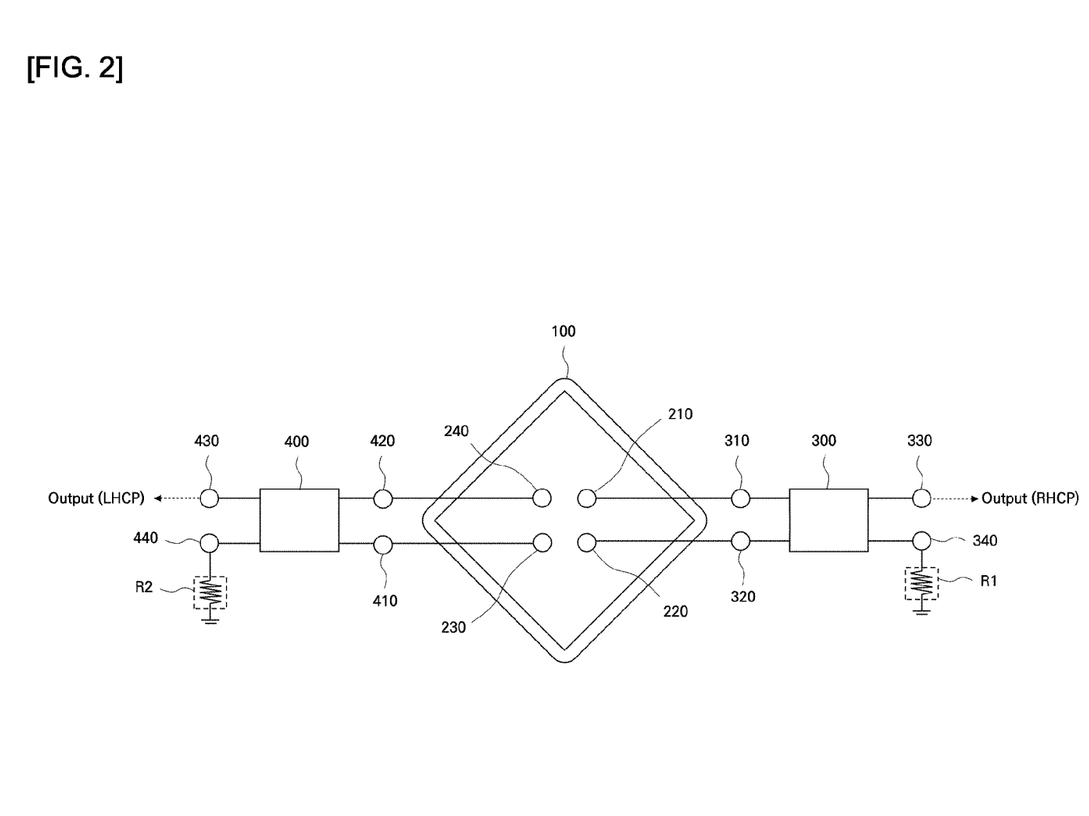
FIG. 2 is a diagram for describing an RFID antenna module according to an embodiment of the present disclosure.

Referring to FIG. 2, the RFID antenna module according to the embodiment of the present disclosure is configured to include a patch antenna 100, a first feed pin 210, a second feed pin 220, a third feed pin 230, a fourth feed pin 240, a first coupler 300, and a second coupler 400. In this case, the first feed pin 210 penetrates through the patch antenna 100 and then is connected to the first input terminal 310 of the first coupler 300, and the second feed pin 220 penetrates through the patch antenna 100 and then is connected to the second input terminal 320 of the first coupler 300. The third feed pin 230 penetrates through the patch antenna 100 and then is connected to the third input terminal 410 of the second coupler 400, and the fourth feed pin 240 penetrates through the patch antenna 100 and then is connected to the fourth input terminal 420 of the second coupler 400.

Figure 3:
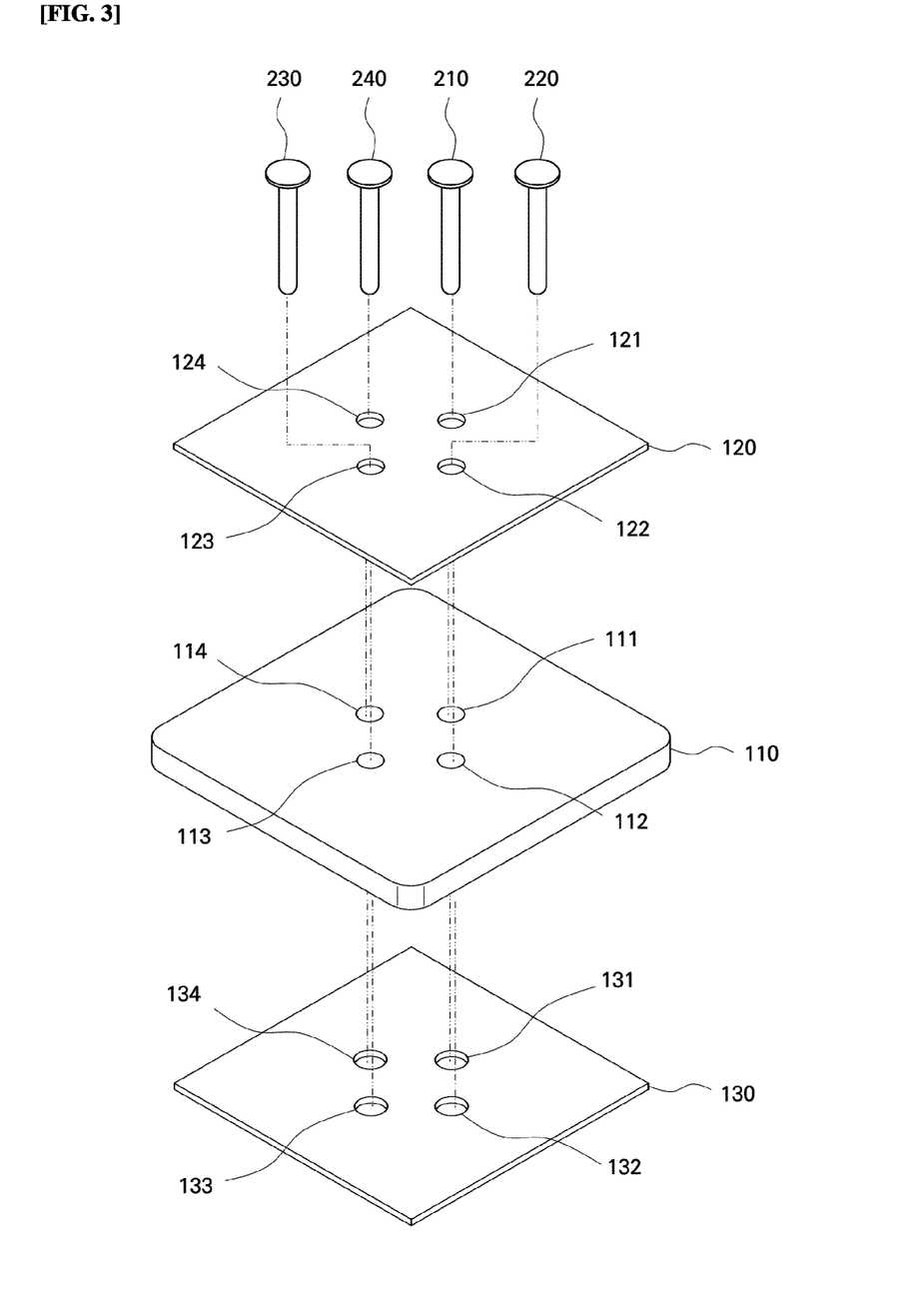
FIG. 3 is a diagram for describing a patch antenna of FIG. 2.

Referring to FIG. 3, the patch antenna 100 is configured to include a base substrate 110, an upper patch 120 and a lower patch 130.

The base substrate 110 is made of a dielectric. That is, the base substrate 110 is composed of a dielectric substrate made of a ceramic material having characteristics such as high permittivity and low thermal expansion coefficient.

The base substrate 110 may also be made of a magnetic material. That is, the base substrate 110 may be composed of a magnetic substrate made of a magnetic material such as ferrite.

The base substrate 110 is provided with a plurality of through holes through which feed pins penetrate. The base substrate 110 is provided with a $1\text{-}1^{st}$ through hole 111 through which the first feed pin 210 penetrates, a $1\text{-}2^{nd}$ through hole 112 through which the second feed pin 220 penetrates, a $1\text{-}3^{rd}$ through hole 113 through which the third feed pin 230 penetrates, and $1\text{-}4^{th}$ through hole 114 through which the fourth feed pin 240 penetrates.

The $1\text{-}1^{st}$ through hole 111 is formed to penetrate through the base substrate 110 at a position spaced apart from a central axis of the base substrate 110 by a predetermined distance. The $1\text{-}2^{nd}$ through hole 112 is spaced apart from a central axis of the base substrate 110 by a predetermined distance, and is formed to penetrate through the base substrate 110 at a position spaced apart from the $1\text{-}1^{st}$ through hole 111. The $1\text{-}3^{th}$ through hole 112 is spaced apart from the central axis of the base substrate 110 by a predetermined distance, and is formed to penetrate through the base substrate 110 at a position spaced apart from the $1\text{-}1^{st}$ through hole 111 and the $1\text{-}2^{nd}$ through hole 112. The $1\text{-}4^{th}$ through hole 114 is spaced apart from the central axis of the base substrate 110 by a predetermined distance, and is formed to penetrate through the base substrate 110 at a position spaced apart from the $1\text{-}1^{st}$ through hole 111, the $1\text{-}2^{nd}$ through hole 112, and the $1\text{-}3^{th}$ through hole 113.

Here, the central axis of the base substrate 110 is an imaginary axis passing through the center point of the upper surface and the center point of the lower surface of the base substrate 110.

The upper patch 120 is disposed on the upper surface of the base substrate 110. The upper patch 120 is composed of a thin plate made of a conductive material having high electrical conductivity, such as copper, aluminum, gold, or silver. The upper patch 120 may be formed in various shapes such as a quadrangle, a triangle, an octagon, etc., according to the shape of the base substrate 110.

The upper patch 120 is composed of a patch for a linear polarization (LP) antenna and is connected to a hybrid coupler to generate circular polarization. Accordingly, the upper patch 120 is formed in a shape in which no chamfer is formed, and all corners are formed in the same shape. In this case, when the upper patch 120 is composed of a patch for a circular polarization (CP) antenna having chamfers formed at corners, the circular polarization required in the present disclosure may not be generated.

The upper patch 120 may be changed into various shapes through a process such as frequency tuning. In this case, the upper patch 120 is supplied with power through the first feed pin 210 to the fourth feed pin 240 and operates as an antenna that resonates in the RFID frequency band.

The upper patch 120 is provided with through holes corresponding to the $1\text{-}1^{st}$ through hole 111, the $1\text{-}2^{nd}$ through hole 112, the $1\text{-}3^{th}$ through hole 113, and the $1\text{-}4^{th}$ through hole 114, respectively, of the base substrate 110.

That is, the upper patch 120 is provided with a 2-1$^{st}$ through hole 121 corresponding to the 1-1$^{st}$ through hole 111 and a 2-2$^{nd}$ through hole 122 corresponding to the 1-2$^{nd}$ through hole 112, a 2-3$^{th}$ through hole 123 corresponding to the 1-3$^{th}$ through hole 113, and a 2-4$^{th}$ through hole 124 corresponding to the 1-4$^{th}$ through hole 114.

The 2-1$^{st}$ through hole 121 is formed to penetrate through the upper patch 120 at a position spaced apart from a central axis of the upper patch 120 by a predetermined distance. The 2-2$^{nd}$ through hole 122 is spaced apart from the central axis of the upper patch 120 by a predetermined distance, and is formed to penetrate through the upper patch 120 at a position spaced apart from the 2-1$^{st}$ through hole 121. The 2-3$^{th}$ through hole 123 is spaced apart from the central axis of the upper patch 120 by a predetermined distance, and is formed to penetrate through the upper patch 120 at a position spaced apart from the 2-1$^{st}$ through hole 121 and the 2-2$^{nd}$ through hole 122. The 2-4$^{th}$ through hole 124 is spaced apart from the central axis of the upper patch 120 by a predetermined distance, and is formed to penetrate through the upper patch 120 at a position spaced apart from the 2-1$^{st}$ through hole 121, the 2-2$^{nd}$ through hole 122, and the 2-3$^{th}$ through hole 123. In this case, the 2-1$^{st}$ through hole 121 to 2-4$^{th}$ through hole 124 may be formed to have a larger diameter compared to the 1-1$^{st}$ through hole 111 to the 1-4$^{th}$ through hole 114 formed in the base substrate 110.

Here, the central axis of the upper patch 120 is an imaginary axis passing through the center point of the upper surface and the center point of the lower surface of the upper patch 120, and is located on the same line as the central axis of the base substrate 110.

The lower patch 130 is disposed on the lower surface of the base substrate 110. The lower patch 130 is composed of a thin plate made of a conductive material having high electrical conductivity, such as copper, aluminum, gold, or silver. The lower radiation patch may be formed in various shapes such as a quadrangle, a triangle, an octagon, etc., according to the shape of the base substrate 110. The lower radiation patch may be changed into various shapes through a process such as frequency tuning. In this case, the lower patch 130 is a patch for the ground (GND) as an example.

The lower patch 130 is provided with through holes corresponding to the 1-1$^{st}$ through hole 111, the 1-2$^{nd}$ through hole 112, the 1-3$^{th}$ through hole 113, and the 1-4$^{th}$ through hole 114 of the base substrate 110, respectively. That is, the lower patch 130 is provided with a 3-1$^{st}$ through hole 131 corresponding to the 1-1$^{st}$ through hole 111 and a 3-2$^{nd}$ through hole 132 corresponding to the 1-2$^{nd}$ through hole 112, a 3-3$^{th}$ through hole 133 corresponding to the 1-3$^{th}$ through hole 113, and a 3-4$^{th}$ through hole 134 corresponding to the 1-4$^{th}$ through hole 114.

The 3-1$^{st}$ through hole 131 is formed to penetrate through the lower patch 130 at a position spaced apart from a central axis of the lower patch 130 by a predetermined distance. The 3-2$^{nd}$ through hole 132 is spaced apart from the central axis of the lower patch 130 by a predetermined distance, and is formed to penetrate through the lower patch 130 at a position spaced apart from the 3-1$^{st}$ through hole 131. The 3-3$^{th}$ through hole 133 is spaced apart from the central axis of the lower patch 130 by a predetermined distance, and is formed to penetrate through the lower patch 130 at a position spaced apart from the 3-1$^{st}$ through hole 131 and the 3-2$^{nd}$ through hole 132. The 3-4$^{th}$ through hole 134 is spaced apart from the central axis of the lower patch 130 by a predetermined distance, and is formed to penetrate through the lower patch 130 at a position spaced apart from the 3-1$^{st}$ through hole 131, the 3-2$^{nd}$ through hole 132, and the 3-3$^{th}$ through hole 133. In this case, the 3-1$^{st}$ through hole 131 to 3-4$^{th}$ through hole 134 may be formed to have a larger diameter compared to the 1-1$^{st}$ through hole 111 to the 1-4$^{th}$ through hole 114 formed in the base substrate 110.

Here, the central axis of the lower patch 130 is an imaginary axis passing through the center point of the upper surface and the center point of the lower surface of the lower patch 130 and is located on the same line as the central axis of the base substrate 110 and the central axis of the upper patch 120.

Figure 4:
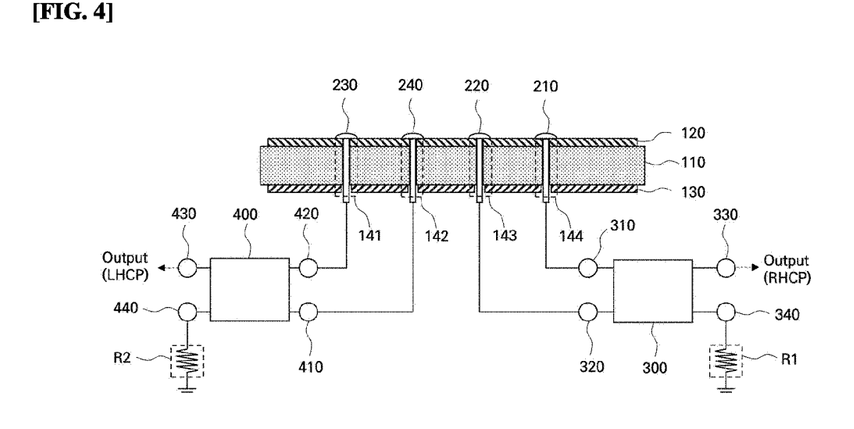
FIG. 4 is a diagram for describing a connection between the patch antenna of FIG. 2 and a first coupler and a second coupler.

Referring to FIG. 4, as the upper patch 120 and the lower patch 130 are laminated on the base substrate 110, the 1-1$^{st}$ through hole 111, the 2-1$^{st}$ through hole 121 and the 3-1$^{st}$ through hole 131 are disposed on the same axis to form a first through hole 141 through which the first feed pin 210 penetrates. The 1-2$^{nd}$ through hole 112, the 2-2$^{nd}$ through hole 122, and the 3-2$^{nd}$ through hole 132 are disposed on the same axis, and the second through hole 142 through which the second feed pin 220 penetrates is formed. The 1-3$^{th}$ through hole 113, the 2-3$^{th}$ through hole 123, and the 3-3$^{th}$ through hole 133 are disposed on the same axis, and a third through hole 143 through which the third feed pin 230 penetrates is formed. The 1-4$^{th}$ through hole 114, the 2-4$^{th}$ through hole 124, and the 3-4$^{th}$ through hole 134 are disposed on the same axis, and a fourth through hole 144 through which the fourth feed pin 240 penetrates is formed.

The first feed pin 210 penetrates through the first through hole 141 of the patch antenna 100 and is connected to a first input terminal 310 of the first coupler 300 at the lower portion of the patch antenna 100. The second feed pin 220 penetrates through the second through hole 142 of the patch antenna 100 and is connected to a second input terminal 320 of the first coupler 300 at the lower portion of the patch antenna 100. The third feed pin 230 penetrates through the third through hole 143 of the patch antenna 100 and is connected to a third input terminal 410 of the second coupler 400 at the lower portion of the patch antenna 100. The fourth feed pin 240 penetrates through the fourth through hole 144 of the patch antenna 100 and is connected to a fourth input terminal 420 of the second coupler 400 at the lower portion of the patch antenna 100.

Figure 5:
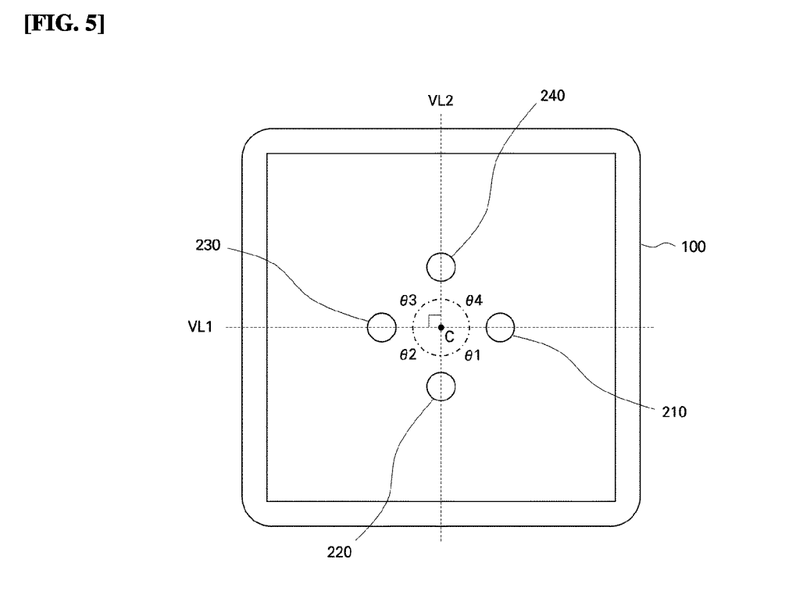
FIG. 5 is a diagram for describing an arrangement of first to fourth feed pins of FIG. 2.

Referring to FIG. 5, the first feed pin 210 to the fourth feed pin 240 are disposed to form a set angle with respect to a central axis C of the patch antenna 100. That is, the first feed pin 210 and the second feed pin 220 are disposed so that an included angle θ1 forms an angle of approximately 85° or more and 95° or less. The second feed pin 220 and the third feed pin 230 are disposed so that an included angle θ2 forms an angle of approximately 85° or more and 95° or less. The third feed pin 230 and the fourth feed pin 240 are disposed so that an included angle θ3 forms an angle of approximately 85° or more and 95° or less. Accordingly, the first feed pin 210 and the fourth feed pin 240 are disposed so that an included angle θ4 forms an angle of approximately 85° or more and 95° or less. In this case, the included angles θ1 to θ4 may be defined as an included angle between the first imaginary line connecting the first feed pin 210 and the third feed pin 230 and the second imaginary line connecting the second feed pin 220 and the fourth feed pin 240.

Meanwhile, both the first feed pin 210 to the fourth feed pin 240 may be disposed at the same angle (i.e., right angle, 90°) with respect to the central axis C of the patch antenna 100. That is, the first feed pin 210 and the second feed pin 220 are disposed so that the included angle θ1 forms 90°. The second feed pin 220 and the third feed pin 230 are disposed so that the included angle θ2 forms 90°. The third feed pin 230 and the fourth feed pin 240 are disposed so that the included angle θ3 forms 90°.

Accordingly, the first feed pin 210 and the fourth feed pin 240 are disposed so that the included angle θ4 forms 90°. In this case, the first feed pin 210 to the fourth feed pin 240 are disposed to be spaced apart from the central axis C of the patch antenna 100 by a predetermined distance.

The first coupler 300 is configured to include the first input terminal 310, the second input terminal 320, a first output terminal 330, and a second output terminal 340. The first input terminal 310 is connected to the first feed pin 210 and the second input terminal 320 is connected to the second feed pin 220. The first coupler 300 converts the RFID signal input through the first input terminal 310 and the second input terminal 320 into the right hand circular polarization (RHCP) signal and outputs the right hand circular polarization signal to the first output terminal 330. The first coupler 300 is composed of a hybrid coupler, and generates a phase difference in the RFID signal to generate the right hand circular polarization (RHCP) signal, and outputs the generated RHCP to the first output terminal 330. In this case, the resistor R1 having a set resistance value of about 50 Ohm is connected to the second output terminal 340.

The second coupler 400 is configured to include a third input terminal 410, a fourth input terminal 420, a third output terminal 430, and a fourth output terminal 440. The third input terminal 410 is connected to the third feed pin 230 and the fourth input terminal 420 is connected to the fourth feed pin 240. The second coupler 400 converts the RFID signal input through the third input terminal 410 and the fourth input terminal 420 into the left hand circular polarization (LHCP) signal and outputs the left hand circular polarization signal to the third output terminal 430. The second coupler 400 is composed of a hybrid coupler, and generates a phase difference in the RFID signal to generate the left hand circular polarization (LHCP) signal, and outputs the generated LHCP to the third output terminal 430. In this case, the resistor R2 having a set resistance value of about 50 Ohm is connected to the fourth output terminal 440.

Figure 6:
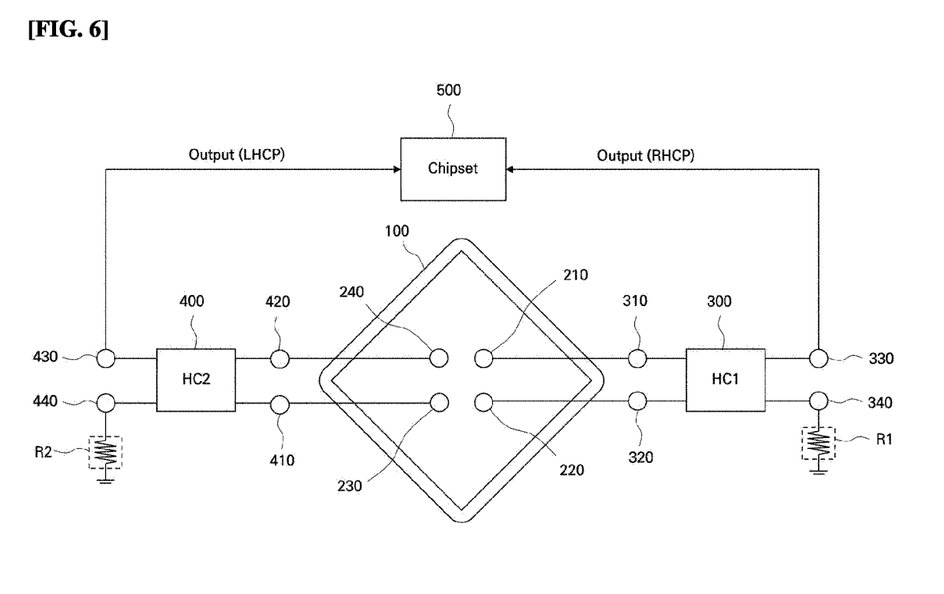
FIGS. 6 and 7 are diagrams for describing a modification of an RFID antenna module according to an embodiment of the present disclosure.

Referring to FIG. 6, the RFID antenna module according to the embodiment of the present disclosure may further include a chipset 500 for processing an RFID signal. The chipset 500 is connected to the first output terminal 330 of the first coupler 300 and the third output terminal 430 of the second coupler 400. The chipset 500 receives at least one of the right hand circular polarization signal of the first coupler 300 and the left hand circular polarization signal of the second coupler 400 to recognize the RFID tag.

Figure 7:
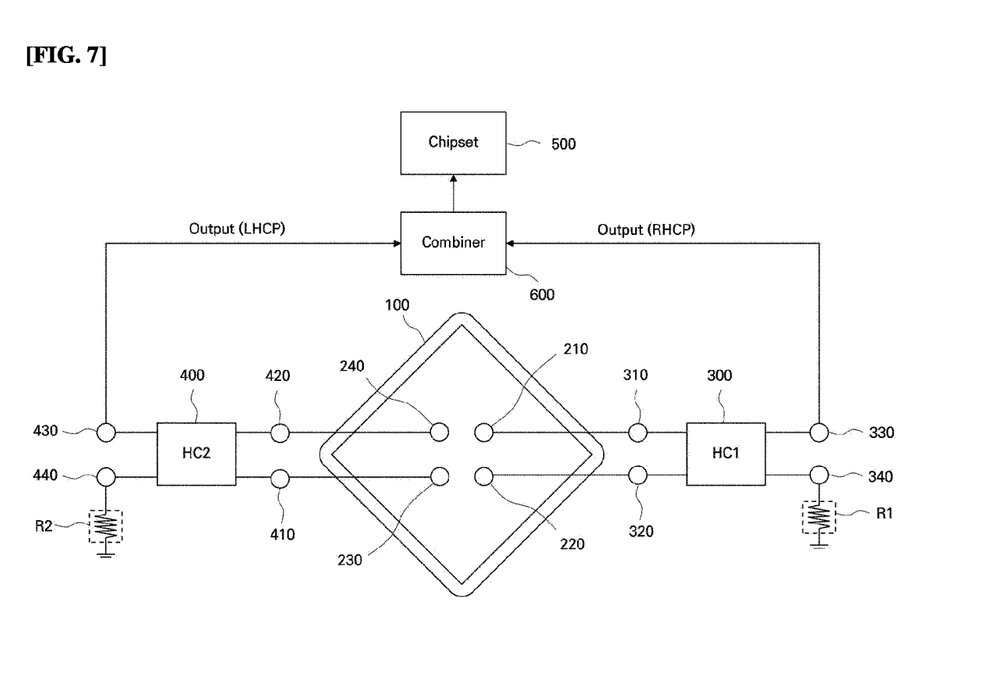

Referring to FIG. 7, the RFID antenna module according to the embodiment of the present disclosure may further include a combiner 600. The combiner 600 is connected to the first output terminal 330 of the first coupler 300 and the third output terminal 430 of the second coupler 400. The combiner 600 combines the right hand circular polarization signal of the first coupler 300 and the left hand circular polarization signal of the second coupler 400 to generate the RFID signal. The combiner 600 outputs the generated RFID signal to the chipset 500. The chipset 500 recognizes the RFID tag based on the RFID signal output from the combiner 600.

In this way, the RFID antenna module according to the embodiment of the present disclosure may implement a recognition speed equivalent to that of the conventional RFID antenna module includes two patch antennas 100.

Although the preferred embodiments according to the present disclosure have been described above, modifications can be made in various forms, and it is understood that those skilled in the art can make various modifications and variations without departing from the scope of the claims of the present disclosure.

The invention claimed is:

1. An RFID antenna module, comprising:
   a dielectric;
   an upper patch disposed on an upper surface of the dielectric;
   a lower patch disposed on a lower surface of the dielectric;
   a first feed pin penetrating through the dielectric, the upper patch and the lower patch;
   a second feed pin penetrating through the dielectric, the upper patch and the lower patch, and spaced apart from the first feed pin;
   a third feed pin penetrating through the dielectric, the upper patch and the lower patch, and spaced apart from the first feed pin and the second feed pin;
   a fourth feed pin penetrating through the dielectric, the upper patch and the lower patch, and spaced apart from the first feed pin, the second feed pin and the third feed pin,
   a first coupler connected to the first feed pin and the second feed pin and converting a signal input through the first feed pin and the second feed pin into a right hand circular polarization signal and outputting the right hand circular polarization signal, and
   a second coupler connected to the third feed pin and the fourth feed pin and converting a signal input through the feed pin the fourth feed pin into a left hand circular polarization signal and outputting the left hand circular polarization signal.

2. The RFID antenna module of claim 1, wherein included angles between a first imaginary line connecting the first feed pin and the third feed pin and a second imaginary line connecting the second feed pin and the fourth feed pin are all formed at the same angle.

3. The RFID antenna module of claim 1, wherein a first imaginary line connecting the first feed pin and the third feed pin and a second imaginary line connecting the second feed pin and the fourth feed pin are orthogonal.

4. The RFID antenna module of claim 1, wherein an included angle between a first imaginary straight line connecting the first feed pin and a center point of the upper patch and a second imaginary straight line connecting the second feed pin and the center point of the upper patch has a set angle of 85° or more and 95° or less.

5. The RFID antenna module of claim 1, wherein an included angle between a third imaginary straight line connecting the third feed pin and a center point of the upper patch and a fourth imaginary straight line connecting the fourth feed pin and the center point of the upper patch has a set angle of 85° or more and 95° or less.

6. The RFID antenna module of claim 1, wherein the first feed pin, the second feed pin, the third feed pin and the fourth feed pin are spaced apart from a center point of the dielectric, the upper patch and the lower patch by the same distance.

7. The RFID antenna module of claim 1, wherein the first coupler includes:
   a first input terminal connected to the first feed pin;
   a second input terminal connected to the second feed pin;
   a first output terminal outputting the right circular polarization signal; and
   a second output terminal to which a first resistor having a set resistance value is connected.

8. The RFID antenna module of claim 1, wherein the second coupler includes:
   a third input terminal connected to the third feed pin;
   a fourth input terminal connected to the fourth feed pin;
   a third output terminal outputting the left hand circular polarization signal; and
   a fourth output terminal to which a second resistor having a set resistance value is connected.

* * * * *